United States Patent [19]

Prevotat

[11] Patent Number: 4,783,299

[45] Date of Patent: Nov. 8, 1988

[54] METHOD AND APPARATUS FOR EXTRUSION OF PLASTIC PIPES WITH COMPOSITE WALLS

[75] Inventor: Bernard Prevotat, Le Chesnay, France

[73] Assignee: Alphacan, France

[21] Appl. No.: 942,195

[22] Filed: Dec. 16, 1986

[30] Foreign Application Priority Data

Dec. 18, 1985 [FR] France .................. 85 18800

[51] Int. Cl.⁴ .......................................... B29C 47/22
[52] U.S. Cl. ................... 264/173; 29/467; 264/541; 264/209.8; 425/133.1; 425/381; 425/462; 425/467
[58] Field of Search ............ 264/173, 541, 209.8, 264/540, 209.2; 425/462, 133.1, 131.1, 467, 381; 29/467

[56] References Cited

U.S. PATENT DOCUMENTS

| | | | |
|---|---|---|---|
| 3,856,448 | 12/1974 | Iijima et al. | 425/462 |
| 3,966,861 | 6/1976 | Papesh et al. | 264/209.2 |
| 4,111,630 | 9/1978 | Shiomi et al. | 264/209.2 |
| 4,185,954 | 1/1980 | Murakami et al. | 425/462 |
| 4,208,175 | 6/1980 | Rosenbaum | 425/462 |
| 4,249,875 | 2/1981 | Hart et al. | 425/462 |
| 4,281,981 | 8/1981 | Feldman | 425/462 |
| 4,364,882 | 12/1982 | Doucet | 264/209.8 |
| 4,499,041 | 2/1985 | Hahn et al. | 425/462 |

FOREIGN PATENT DOCUMENTS

| | | | |
|---|---|---|---|
| 2528278 | 12/1976 | Fed. Rep. of Germany | 264/173 |
| 51-28668 | 8/1976 | Japan | 425/133.1 |
| 53-14105 | 5/1978 | Japan | 425/133.1 |
| 54-15891 | 6/1979 | Japan | 425/133.1 |

*Primary Examiner*—Jeffery Thurlow
*Attorney, Agent, or Firm*—Sigalos, Levine & Montgomery

[57] ABSTRACT

A central body portion has first, second and third concentric cylinders of successively increasing diameter encircling the central body portion and each other in spaced relationship to form three concentric annular spaces for receiving molten material. Only one end of each of the first, second and third cylinders and the body portion are rigidly attached to each other so as to maintain the rigid spaced relationship. A mandrel is attached to the outer end of the central body portion and a die is attached to the outer end of the outer most concentric cylinder in spaced relationship to the mandrel to shape the molten material into a pipe having a multi-layered wall.

14 Claims, 2 Drawing Sheets

METHOD AND APPARATUS FOR EXTRUSION OF PLASTIC PIPES WITH COMPOSITE WALLS

BACKGROUND OF THE INVENTION

The present invention concerns a method and apparatus for the extrusion of plastic pipes with composite walls.

Plastic pipes are currently being used pipelines or pipe systems such as water mains, sewer lines, conduits and the like because of their light weight, their ease of placement or positioning and their ease of linking or connection with each other as well as their resistance to corrosion. It is now customary for these pipes to be a composite structure formed by three layers. Two of the layers form the exterior and interior walls with the intermediate or third layer or core being either of identical or different material from that forming the walls. Very often the third layer is made of lighter material than the other two. Such three layer walls are customarily made by co-extrusion.

Equipment and a performing process making it possible to construct such composite pipes are described in French patent No. 2,455,972. The equipment according to that patent is constituted of a distribution head, which is heated and regulated and which is supplied with a molten plastic material by a first extruder. The distribution head uses the material from the first extruder to form the exterior and interior walls of the pipe and uses a second molten plastic material from a second extruder to form the core of the pipe. This distribution head possesses channels to separate the first molten material into two distinct streams of flow to form the two walls. Between these two streams there exists a channel for introduction of the second molten material constituting the core as a third stream. Before passing into the die which forms the composite pipe, the three united streams are passed over a divergent cone arranged at the outlet of the distribution head where the three streams of flowing material are united or converged into a single stream.

According to the prior art, one of the extruders supplies the first material to the distribution head in standard axisymmetrical fashion. Such a supply requires the use of a first set of blades mounted in the flow path of the molten material in order to support the metallic core forming part of the distribution head. In the same way, at its greatest diameter, the divergent cone requires the existence of a second set of supporting blades making it possible to attach the divergent cone to the apparatus in a rigid spaced relationship. In this type of equipment, a first set of at least three blades support the distribution head center section or metallic core and a second set of at least four blades support the divergent outlet cone. These two sets of blades are located in the path of flow of the molten plastic materials and are particularly troublesome in that, first, they leave more or less rectilinear traces on the final material and, second, in order to reduce or eliminate these traces by allowing the cleanest possible fusing of the molten products after passing the blades, it is necessary to have considerable separation between the last blades and the die thereby requiring the use of an apparatus of extended length.

In order to obtain multi-layer films, a complex system has been proposed in U.S. Pat. No. 3,576,758 consisting of axiasymmetrically parallel ducts ending at different distributors for each of the flows located ahead of the common die as in the case of the divergent cone of the preceding technique. These flow distributors are located or positioned in a direction perpendicular to the axis of the equipment and necessarily comprise a set of blades for support and have the disadvantages previously disclosed. With that technique of axiasymmetrical material supply, the first set of blades of the distribution head have been eliminated, but it is not possible with that system to eliminate the other set of blades preceding the die.

From this known prior art, it is not possible to construct multi-layer pipes by co-extrusion of materials without using apparatus comprising at least one set of blades mounted in the flow path of the molten materials.

The equipment according to the present invention overcomes these prior art disadvantages by the fact that all of the supporting blades are eliminated. The integrally formed distribution head and mandrel are formed as a part of the body of an extruder up stream of the supply of the molten material to the flow distributors. This improvement makes it possible to substantially improve the surface appearance of the pipes produced.

The invention comprises a novel distribution head that is heated and regulated. It is in operative relationship with a first extruder which supplies the molten plastic material constituting the walls of the pipe and with a second extruder which supplies the molten plastic material constituting the core. The distribution head in a novel manner possesses a means of separating the flow of the molten plastic material which will constitute the pipe exterior and interior walls into two distinct streams of flow. Further, it includes a novel means of introduction of the molten plastic material constituting the core which forms a third stream of flow between the first two streams of flow and a means of bringing the three streams together and placing them in contact with each other in order to form the rough shape of molten material which is supplied to the die and mandrel forming the extrusion tool.

This equipment is characterized by the fact that the means for supplying the two separate streams of molten material to form the walls and the means of introduction of the molten material constituting the core are arranged axiasymmetrically in relation to the axis of the distribution head and extrusion tool in such a way that a unitary device is formed and fixed directly to the body of an extruder up stream of the supply of the molten flow of material to the distribution head.

The unitary device has a central body portion and first, second and third concentric cylinders of successively increasing diameter encircling said central body portion and each other in spaced relationship to form three concentric annular spaces for receiving molten material. Only one end of each of the first, second and third cylinders and the body portion are attached to each other so as to maintain the rigid spaced relationship. A mandrel is attached to the outer end of the central body portion and a die is attached to the outer end of the outermost concentric cylinder in spaced relationship with the mandrel to shape the molten material from the three annular spaces into a pipe having a multi-layered wall.

BRIEF DESCRIPTION OF THE DRAWINGS

These and other objects of the present invention will be disclosed in conjunction with the accompanying drawings in which like numerals represent like components and in which.

DETAILED DESCRIPTION OF THE INVENTION

Figure 1:
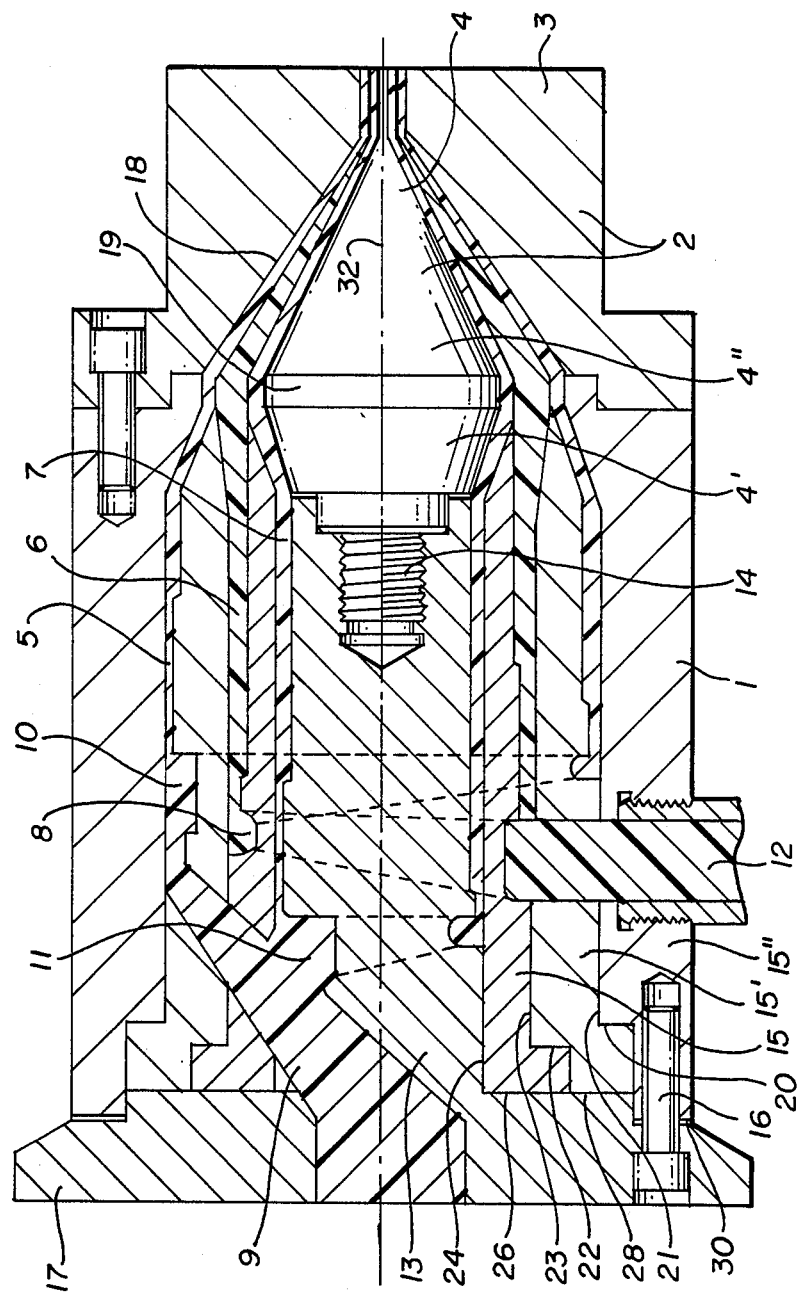
FIG. 1 is a cross-sectional view of the preferred embodiment of the invention.

FIG. 1 illustrates a cross-section of the apparatus according to the invention and comprises distribution head (1) and extrusion tool (2) which includes die (3) and mandrel (4). The distribution head (1) is formed of a central body portion (13) and three concentric cylinders (15), (15') and (15") of successively increasing diameter encircling the central body portion (13) and each other. This construction forms three annular spaces or ducts (5) (6) (7) which join together or converge approximately at the maximum diameter (19) of the extrusion tool (2). The two ducts or spaces (5) and (7) serve as a passage for the molten material constituting the exterior and interior walls of the pipe and surrounding the space or duct (6) serving as a passage for the molten material constituting the core of the pipe wall. Spaces or ducts (5) and (6) are joined together upstream of the flow distributor (8) by means of the supply duct or cavity (9). This cavity (9) supplies the flow distributors (10) and (11) for annular ducts or spaces (5) and (7). The flow distributor (8) is supplied molten material for the core of the pipe wall by duct (12). According to this embodiment, the supply ducts (9) and (12) of the flow distributors are arranged axiasymmetrically with respect to the axis of the distribution head (1) and extrusion tool (2). The term "axiasymmetrical" is used herein to mean any arrangement of the supply ducts (9) and (12) other than symmetrical with respect to the axis of the distribution head (1). Under this definition, the arrangement of the two supply ducts (9) and (12) radially with respect to the distribution head axis is intended to be included. With this axiasymmetrical arrangement the entire central body (13) representing the internal body portion of the distribution head (1) is made in one piece with the concentric cylinders (15), (15') and (15") representing the remaining body of the distribution head (1).

Note that at least a part of central body portion (13) and first concentric cylinder (15) are in physical contact at (24) thereby creating annular space (7) between only a part of body portion (13) and first cylinder (15). Note also that the end (26) of cylinder (15) is in abutting relationship with extruder body (17). In like manner, second concentric cylinder (15') interlocks one end of the first cylinder (15) at (22) and is in abutting contact with a portion of the first cylinder (15) at (23) an extruder body (17) at (28). Thus, the first cylinder (15) is securely held by the interlocking relationship with the portion 22 of second cylinder (15'). Also, the third or outer concentric cylinder (15") interlocks with the end of the second cylinder (15') at (20) and physically abuts it at (21). Outer or third cylinder (15") also abuts extruder body (17) at (30) where a bolt (16) is used to secure cylinder (15") to extruder (17). Because only one end or base of each cylinder is interlocked with each other and to extruder (17) and because only portion of the ends of the three cylinders physically abut each other at (21), (23) and (24), the three annular spaces or ducts (5), (6) and (7) are formed.

The mandrel (4) is comprised of two truncated cones, one divergent (4') and one convergent (4") and is integrally formed with a means of attachment (14) for removable attachment to central body (13). With this construction of the mandrel (4), without any supporting blades, the length of the distribution head (1) is reduced. In addition, the axiasymmetrical arrangement of the supply ducts of the flow distributors (9) and (12), makes possible the integral formation of the central body (13) with the extruder body (17) and the attachment of the rear of the remainder of the distribution head (1) to the extruder body (17) as for instance, by means of bolts (16). Thus, by the rigidity of construction and the reduced length of entire unit, the requirement of placing any blades in annular spaces or ducts (5), (6) and (7) in the path of the molten material is avoided.

The means (14) of attachment of the mandrel (4) to the central body (13) is such that it can preferably be adjusted along horizontal axis 32 in any well-known manner and can, for instance, be slidably attached to the central piece (13) to make it possible to move the mandrel (4) in either the forward or reverse directions axially with respect to the distribution head (1). This possibility of adjustment, as a function of the geometry of the mandrel, makes it possible to adjust the thickness of the different layers and, in particular, of the internal layer of the pipe by variation of the thickness or width of the ducts or passages (7) and (18).

Figure 2:
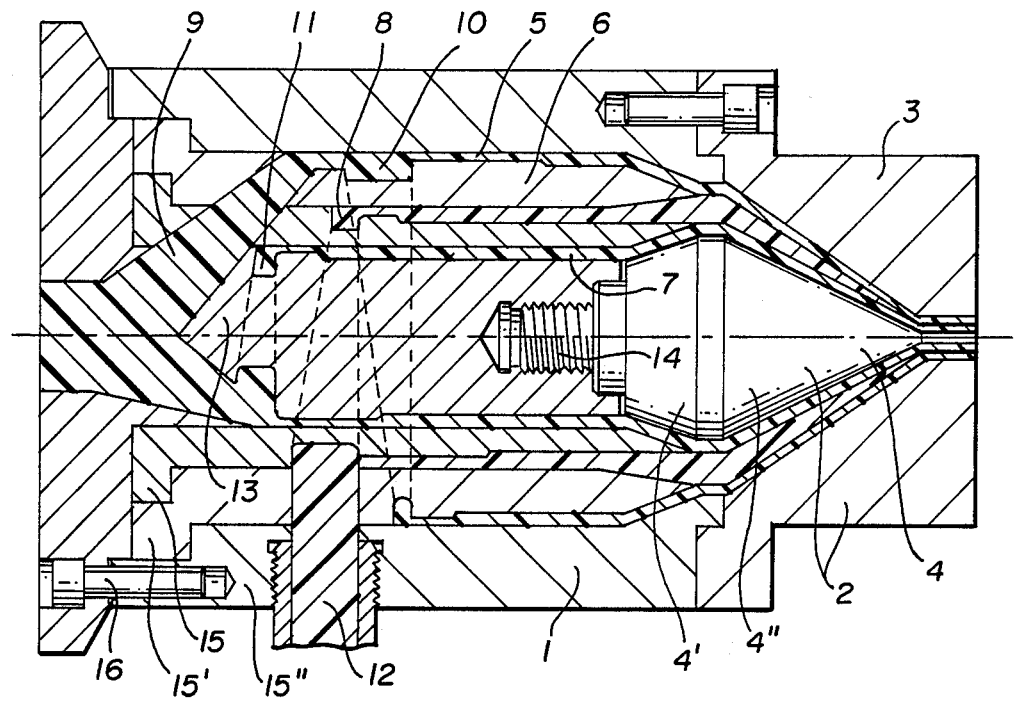
FIG. 2 is a cross-sectional view of a second embodiment of the invention.

FIG. 2 is a variation of FIG. 1 and illustrates a possible arrangement in the central body portion (13) of several ducts or passages (axiasymmetrical in relation to the axis of the distribution head (1)) for coupling supply (9) to the flow distributors (10) and (11) which feed molten material to the ducts (5) and (7) serving for the passage of the molten material to be used for forming the interior and exterior walls of the pipe. More particularly, duct (9) is coupled to both flow distributors (10) and (11) which feed paths (5) and (7) in the central piece (13).

Figure 3:
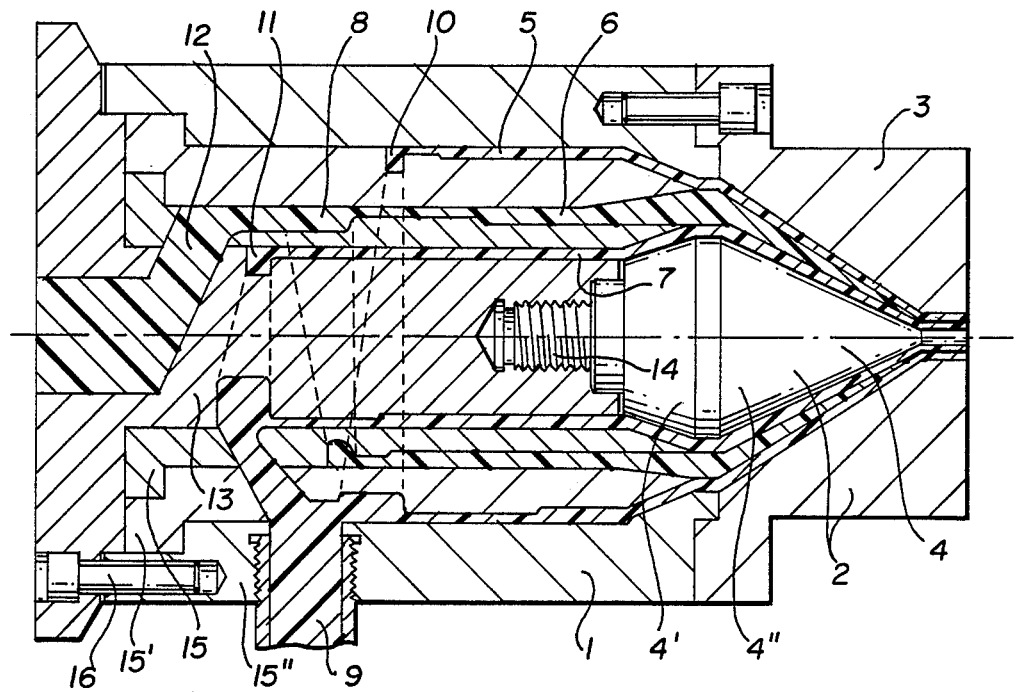
FIG. 3 is a cross-sectional view of a third embodiment of the invention.

FIG. 3 is also a variation of FIG. 1 and illustrates one of numerous possibilities for the arrangements of ducts (9) and (12) which supply the flow distributors (10) and (11) for the three annular spaces or ducts (5), (6) and (7) without it being necessary to utilize support blades anywhere in the paths of molten material flow.

The equipment arrangement according to the invention makes possible the fabrication of plastic pipes with composite walls free from defects. The process consists of introducing into the distribution head (1) which is heated and adjusted, the molten material to be used in constituting the walls of the pipe. The molten material is separated into two streams of flow between which a molten filling material is injected thus forming a third stream of flow which is placed in contact with the two other streams of molten material prior to definitely shaping them in a die and possibly in a shaper.

More particularly, the process consists of supplying plastic material by means of two extruders to a distribution head (1) in which the plastic material distributed by a first supply duct (9) to two flow distributors (10) and (11) is then coupled to annular ducts (5) and (7) in order to form the interior and exterior walls of the pipe and by a second supply duct (12) into an intermediary annular duct (6) in order to form the core of the pipe. In one embodiment, the supply duct (9) for the two annular ducts (5) and (7) divides the plastic material for the two flows upstream of the supply of the plastic material from flow distributor (8) to the intermediate annular duct or passage (6) which forms the pipe core. The three flows of plastic material are united at the junction point (19) of the divergent (4') and convergent (4") truncated cones forming the mandrel (4). The flow distributors (10) and (11) are supplied molten material axiasymmetrically in relation to the axis of the distribution head (1).

Since the mandrel (4) is directly fixed to or integrally formed with the central piece (13) the molten materials flow into the distribution head (1) without interference of any supporting blades.

With the apparatus according to the invention it is possible to extrude two different plastic materials. It is likewise possible to extrude a pipe possessing dense walls and a lighter core. This equipment would, however, easily be adaptable to the co-extrusion of three materials. It would suffice to divide duct (9) into two ducts and to connect each of the ducts to an extruder. In that case the complete extrusion unit would necessitate three extruders or separate sources of molten material.

The equipment in suitable for all extrudable plastic materials, in particular, polyvinylchloride, polyolefins or polystyrene. When the core of the pipe produced is constituted of a lightened plastic material, an expansible material is selected which is preferably compatible with the material constituting the wall so that a sufficient adhesion establish itself between the walls and the core in order to insure the adhesion of the composite material.

In order to change the dimensions of the pipe, it suffices to change the extrusion tools, namely, the die (3) and mandrel (4). In addition, the adjustment of the thickness of the interior and exterior walls of the pipe can be carried out as already indicated by positioning of the mandrel with respect to the central piece (13) and the die (3) along the horizontal axis (32). It is also possible to adjust, in a well-known manner, the thickness of the walls and of the core by modulating the flow rates of the extruders with respect to one another.

By means of this equipment, pipes possessing an excellent surface appearance are obtained with no supporting blades to leave traces on the pipes as in the prior art apparatus and processes.

Thus there has been disclosed a novel apparatus and method for extrusion of plastic pipes with a composite structure forming a multi-layered wall wherein first, second and third concentric cylinders of successively increasing diameter encircle a central body portion. Only one end of each of the first, second and third cylinders and the body portion are rigidly connected to each other so as to maintain the rigid spaced relationship. A mandrel is attached to the outer end of the central body portion and a die is attached to the outer end of the outer most concentric cylinder in spaced relationship with the mandrel to shape the molten material into a pipe having a multi-layered wall. The outer most concentric cylinder is also attached to the extrusion head by means of bolts or in any other well-known manner to form a unitary distribution head assembly in which the three concentric cylinders and the central body portion are maintained in spaced relationship with respect to each other without the use of any blades in the molten material channels which would cause rectilinear traces on the final material.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. Apparatus for extrusion of plastic pipe with a composite structure forming a multiple layer wall comprising:
   a. a base portion,
   b. a central body portion of generally cylindrical shape integrally formed with and rigidly extending from said base portion and having a mandrel at the outer end,
   c. a first concentric cylinder encircling said central body portion so as to create a first annular space between at least a part of said central body portion and said first cylinder, one end of said first cylinder abutting said base portion for rigid support,
   d. a second concentric cylinder encircling said first cylinder so as to create a second annular space between at least a part of said first cylinder and said second cylinder, one end of said second cylinder interlocking said one end of said first cylinder and engaging said base portion for rigid support,
   e. an outer body portion having a cylindrical cavity encircling said second concentric cylinder so as to create a third annular space between at least a portion of said second cylinder and said outer body portion cavity,
   f. means on said outer body portion for interlocking with said one end of said second cylinder and for abutting attachment to said base portion for rigid support of said first and second cylinders and said outer body portion in said spaced relationship,
   g. first channel means for enabling said first and third annular spaces to receive a molten material from a first source and a second channel means for enabling said second annular space to receive molten material from a second source, and
   h. means for attaching a die to the outer end of said outer body portion in spaced relationship with said mandrel to shape said extruded material into a pipe having a multi-layered wall.

2. Apparatus as in claim 1 further comprising:
   a. at least a first circumferential groove in the outer surface of said central body portion in fluid flow contact with said first source of molten material to allow said molten material from said first source to surround said central body portion and fill said first annular space,
   b. at least a second circumferential groove in the outer surface of said first concentric cylinder in fluid flow contact with said second source of molten material to allow said molten material from said second source to surround said first concentric cylinder and fill said second annular space, and
   c. at least a third circumferential groove in the outer surface of said second concentric cylinder in fluid flow contact with said first source of molten material to allow said molten material from said first source to surround said second concentric cylinder and fill said third annular space.

3. Apparatus as in claim 2 wherein said central body portion comprises:
   a. one end integrally formed with said base portion, and b. means for removably attaching said mandrel to said outer end of said central body portion for movement of said mandrel along the axis of said central body portion toward or away from said die so as to increase or decrease said space between said die and said mandrel thereby adjusting the thickness of said multi-layered pipe wall.

4. Apparatus as in claim 3 wherein said mandrel comprises:
   a. a truncated cone portion having the converging end removably attached to said central body portion, and
   b. a funnel shaped body portion integrally formed with said truncated cone portion and having its converging end in spaced relationship with said die to form said pipe.

5. Apparatus as in claim 4 further comprising means for converging the molten fluid from said first, second and third annular spaces at approximately the junction of said truncated cone and said funnel shaped body portion forming said mandrel.

6. Apparatus for extrusion of plastic pipe with a composite structure forming a multi-layered pipe wall comprising:
   a. a central body portion,
   b. first, second and third concentric cylinders of successively increasing diameter encircling said central body portion and each other in spaced relationship to form three concentric annular spaces for receiving molten material,
   c. means for rigidly interlocking only one end of each of said first, second and third cylinders with each other for abutting engagement with and attachment to said central body portion so as to maintain said rigid spaced relationship,
   d. a mandrel attached to the outer end of said central body portion, and
   e. a die attached to the outer end of the outer most concentric cylinder in spaced relationship with said mandrel to shape said molten material from said three annular spaces into a pipe having a multi-layered wall.

7. A method for extrusion of plastic pipes with a composite structure forming a multi-layered wall comprising the steps of:
   a. forming a base portion,
   b. integrally forming a central body portion of generally cylindrical shape with, and rigidly extending from, said base portion,
   c. attaching a mandrel to the outer end of said central body portion,
   d. encircling said central body portion with a first concentric cylinder so as to create a first annular space between at least a part of said central body portion and said first cylinder, one end of said first cylinder abutting said base portion for rigid support,
   e. encircling said first cylinder with a second concentric cylinder so as to create a second annular space between at least a part of said first cylinder and said second cylinder, one end of said second cylinder interlocking said one end of said first cylinder and engaging said base portion for rigid support,
   f. encircling said second concentric cylinder with an outer body portion having a cylindrical cavity so as to create a third annular space between at least a portion of said second cylinder and said outer body portion cavity, one end of said outer body portion interlocking with said one end of said second cylinder,
   g. attaching said interlocked end of said outer body portion to said base portion in an abutting relationship for rigid support of said first and second cylinders and said outer body portion in said spaced relationship,
   h. providing a first channel for enabling said first and third spaces to receive a molten material from a first source and a second channel for enabling said second space to receive molten material from a second source and
   i. attaching a die to the outer end of said outer body portion in spaced relationship with said mandrel to shape said extruded plastic into a pipe having a multi-layered wall.

8. A method as in claim 7 further comprising the steps of:
   a. forming at least a first circumferential groove in the outer surface of said central body portion for fluid flow contact with said first source of molten material to allow said molten material from said first source to surround said central body portion and fill said first annular space,
   b. forming at least a second circumferential groove in the outer surface of said first concentric cylinder for fluid flow contact with said second source of molten material to allow said molten material from said second source to surround said first concentric cylinder and fill said second annular space, and
   c. forming at least a third circumferential groove in the outer surface of said second concentric cylinder for fluid flow contact with said first source of molten material to allow said molten material from said first source to surround said second concentric cylinder and fill said third annular space.

9. A method as in claim 8 further comprising the steps of:
   a. integrally forming one end of said central body portion with said base portion, and
   b. adjustably attaching said mandrel to the other end of central body portion for movement of said mandrel along the axis of said central body portion toward or away from said die so as to increase or decrease said space between said die and said mandrel such that the thickness of the wall of said pipe is adjusted.

10. A method as in claim 9 further comprising the steps of:
    a. forming a first portion of said mandrel in the shape of a truncated cone having the converging end removably attached to said central body portion, and
    b. integrally forming a second portion of said mandrel in a funnel shape having its converging end in spaced relationship with said die to form said pipe with said multi-layered wall.

11. A method as in claim 10 further comprising the step of converging the molten fluid from said first, second and third annular spaces at approximately the junction of said truncated cone portion and said funnel shaped portion forming said mandrel.

12. A method for extrusion of plastic pipe with a composite structure forming a multi-layered pipe wall comprising the steps of:
    a. forming a central body portion,
    b. encircling said central body portion with first, second and third concentric cylinders of successively increasing diameter in spaced relationship to form three concentric annular spaces for receiving molten material,
c. rigidly attaching only one end of each of said first, second and third cylinders and said body portion to each other in an abutting relationship so as to maintain said rigid spaced relationship,
d. attaching a mandrel to the outer end of said body portion, and
e. attaching a die to the outer end of the outer most concentric cylinder in spaced relationship with said mandrel to shape said molten material into a pipe having a multi-layered wall.

13. Apparatus for extrusion of plastic pipe with a composite structure forming a multiple layered wall comprising:
a. a base portion,
b. a central body portion of generally cylindrical shaped rigidly extending from said base portion and having a mandrel at the outer end,
c. a first concentric cylinder encircling said central body portion so as to create a first annular space between at least a part of said central body portion and said first cylinder, one end of said first cylinder abutting said base portion for rigid support,
d. a second concentric cylinder encircling said first cylinder so as to create a second annular space between at least a part of said first cylinder and said second cylinder, one end of said second cylinder interlocking said one end of said first cylinder for rigid support,
e. an outer body portion having a cylindrical cavity encircling said second concentric cylinder so as to create a third annular space between at least a portion of said second cylinder and said outer body portion cavity,
f. means on said outer body portion for interlocking with said one end of said second cylinder and for attachment to said base portion for rigid support of said first and second cylinders and said outer body portion in said spaced relationship,
g. first channel means for enabling said first and third annular spaces to receive a molten material from a first source and a second channel means for enabling said second annular space to receive molten material from a second source,
h. means for attaching a die to the outer end of said outer body portion in spaced relationship with said mandrel to shape said extruded material into a pipe having a multi-layered wall, and
i. means for removably attaching said mandrel to said outer end of said central body portion for movement of said mandrel along the longitudinal axis of said central body portion toward or away from said die so as to increase or decrease said space between said die and said mandrel thereby adjusting the thickness of said multi-layer pipe wall.

14. A method for extrusion of plastic pipes with a composite structure forming a multi-layered wall comprising the steps of:
a. forming a base portion,
b. rigidly extending a central body portion of generally cylindrical shape from said base portion,
c. encircling said central body portion with a first concentric cylinder so as to create a first annular space between at least a part of said central body portion and said first cylinder, one end of said first cylinder abutting said base portion for rigid support,
d. encircling said first cylinder with a second concentric cylinder so as to create a second annular space between at least a part of said first cylinder and said second cylinder, one end of said second cylinder interlocking said one end of said first cylinder for rigid support,
e. encircling said second concentric cylinder with an outer body portion having a cylindrical cavity so as to create a third annular space between at least a portion of said second cylinder and said outer body portion cavity, one end of said outer body portion interlocking with said one end of said second cylinder;
f. attaching said interlocked end of said outer body portion to said base portion for rigid support of said first and second cylinders and said outer body portion in said spaced relationship,
g. providing a first channel for enabling said first and third spaces to receive a molten material from a first source and a second channel for enabling said second space to receive molten material from a second source,
h. adjustably attaching a mandrel to the outer end of said central body portion for movement of said mandrel along the longitudinal axis of said central body portion toward or away from a die so as to increase or decrease said space between said die and said mandrel such that the thickness of the wall of said pipe is adjusted, and
i. attaching said die to the outer end of said outer body portion in spaced relationship with said mandrel to shape said extruded plastic into a pipe having a multi-layered wall.

* * * * *